(12) United States Patent
Lin

(10) Patent No.: US 7,242,564 B2
(45) Date of Patent: Jul. 10, 2007

(54) ESD PROTECTION CIRCUIT FOR CHARGE PUMP AND ELECTRONIC DEVICE AND SYSTEM USING THE SAME

(75) Inventor: Ching-Wei Lin, Taoyuan (TW)

(73) Assignee: Toppoly Optoelectronics Corporation (TW)

( * ) Notice: Subject to any disclaimer, the term of this patent is extended or adjusted under 35 U.S.C. 154(b) by 204 days.

(21) Appl. No.: 10/968,243

(22) Filed: Oct. 20, 2004

(65) Prior Publication Data
US 2006/0082940 A1  Apr. 20, 2006

(51) Int. Cl.
*H02H 3/20* (2006.01)
(52) U.S. Cl. ...................................... 361/103
(58) Field of Classification Search ............... 361/91.1; 349/40, 54, 50
See application file for complete search history.

(56) References Cited
U.S. PATENT DOCUMENTS 5,777,367 A * 7/1998 Zambrano .................. 257/355
5,859,632 A * 1/1999 Ito .............................. 345/211
6,118,640 A * 9/2000 Kwong ......................... 361/56
6,452,086 B1 * 9/2002 Muller ........................ 136/244
2002/0105512 A1 * 8/2002 Kwon ......................... 345/212

* cited by examiner

*Primary Examiner*—Stephen W. Jackson
*Assistant Examiner*—Scott Bauer
(74) *Attorney, Agent, or Firm*—MH2 Technology Law Group

(57) ABSTRACT

An ESD protection circuit for a charge pump circuit, wherein the charge pump circuit provides a first voltage pin and a second voltage pin, and the absolute value of a voltage provided by the first voltage pin being greater than or equal to the absolute value of a voltage provided by the second voltage pin, and the two voltages have the same phase. The ESD protection circuit comprises a first diode reversely connected between the second voltage pin and ground, and a second diode reversely connected between the second voltage pin and the first voltage pin.

12 Claims, 5 Drawing Sheets

US 7,242,564 B2

ESD PROTECTION CIRCUIT FOR CHARGE PUMP AND ELECTRONIC DEVICE AND SYSTEM USING THE SAME

BACKGROUND OF THE INVENTION

1. Field of Invention

The present invention relates in general to an electrostatic discharge (ESD) protection circuit. More particularly, the invention relates to an ESD protection circuit for a charge pump integrated in an LCD panel, and an electronic device and system using the same.

2. Description of Related Art

For commercial consideration, circuits are integrated together to reduce the total device size and production cost. However, as circuits are integrated together, problem arise with discharging electrostatic charge.

ESD protection circuits are commonly used to preventing the circuit from being damaged by discharging electrostatic charges. Generally, ESD protection circuits are applied on a signal I/O pad/pin that receives or outputs signals. Referring to FIG. 1, an exemplary ESD protection circuit is presented. As shown in FIG. 1, VDD and VSS are power sources in the electronic device 10, and each of the signal pins 100, 110, and 120 are connected to an ESD protection circuit 130, 140 and 150, respectively. Generally, ESD protection circuits are connected between the power sources VDD and VSS. For example, ESD protection circuit 130 has two diodes 132 and 134. Diode 132 is reversely connected between VSS and signal pin 100, and diode 134 is reversely connected between VDD and signal pin 100. By using the ESD protection circuit 130, the discharged electrostatic charges from signal pin 100 are released to VDD or VSS via diode 134 or 132, respectively.

However, the ESD protection circuit shown in FIG. 1 could not be used for a charge pump because a signal I/O pin may output or receive a voltage either higher than VDD or lower than VSS. The diodes in the ESD protection circuit are engaged when the received or output voltage is higher than VDD or lower than VSS. This results in abnormal operation of the ESD protection circuit.

SUMMARY OF THE INVENTION

According to various embodiments there is an ESD protection circuit for a charge pump integrated in LCD panel to protect the charge pump from being damaged by electrostatic discharging.

According to various embodiments there is an ESD protection circuit for a charge pump circuit that includes diodes in the ESD protection circuit that are reversely connected between ground and a signal pin or reversely connected between two signal pins that provide different voltages.

According to various embodiments there is an ESD protection circuit for a charge pump circuit. The charge pump circuit can include a source pin set, a target pin set, and a grounding pin electrically connected to ground. According to various embodiments each of the source and target pin set can include a first positive pin that provides a first positive voltage, a second positive pin that provides a second positive voltage, a first negative pin that provides a first negative voltage, and a second negative pin that provides a second negative voltage. According to various embodiments the ESD protection circuit can comprise a first diode set, which is reversely connected between the first/second positive pins of the source pin set and the grounding pin, a second diode set, which is reversely connected between the first/second positive pins of the source pin set and the first positive pin of the target pin set, a third diode set, which is reversely connected between the first/second negative pins of the source pin set and the grounding pin, and a fourth diode set, which is reversely connected between the first/second negative pins of the source pin set and the first negative pin of the target pin set. Further, the first positive pin can provide a voltage that is greater than or equal to the voltage provided by the second positive pin. Moreover, the first negative pin can provide a voltage that is less than or equal to the voltage provided by the second negative pin.

According to various embodiments there is an ESD protection circuit for a charge pump circuit, where the charge pump circuit can provide a first voltage pin and a second voltage pin. Further, the absolute value of a voltage provided by the first voltage pin being greater than or equal to the absolute value of a voltage provided by the second voltage pin. According to various embodiments the two voltages can have the same phase. The ESD protection circuit can also comprise a first diode, which is reversely connected between the second voltage pin and ground, and a second diode, which is reversely connected between the second voltage pin and the first voltage pin.

According to various embodiments there is an electronic device with a charge pump circuit having an ESD protection circuit. The electronic device can comprise a charge pump circuit, including a first voltage pin and a second voltage pin, the absolute value of a voltage provided by the first voltage pin being greater than or equal to the absolute value of a voltage provided by the second voltage pin. According to various embodiments the two voltages can have the same phase. Moreover, according to various embodiments the ESD protection circuit can comprise a first diode reversely connected between the second voltage pin and ground and a second diode reversely connected between the second voltage pin and the first voltage pin.

According to various embodiments there is an electronic system with a charge pump circuit having ESD protection circuit. The electronic system can comprise a power source for providing a power; a charge pump circuit, electrically connecting to the power source that can receive the power, generate voltages, and output voltages having the same phase via a first voltage pin and a second voltage pin respectively. According to various embodiments the absolute value of the voltage output by the first voltage pin being greater than or equal to the absolute value of the voltage output by the second voltage pin. Moreover, according to various embodiments the ESD protection circuit, comprising a first diode reversely connected between the second voltage pin and ground and a second diode reversely connected between the second voltage pin and the first voltage pin.

According to various embodiments diodes in the ESD protection circuit can always be reversely connected between two voltages. As such, the ESD protection circuit only works when an abnormal voltage caused by discharging of electrostatic charge occurs. Charge pumps can be protected by using the ESD protection circuit provided by the present invention.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
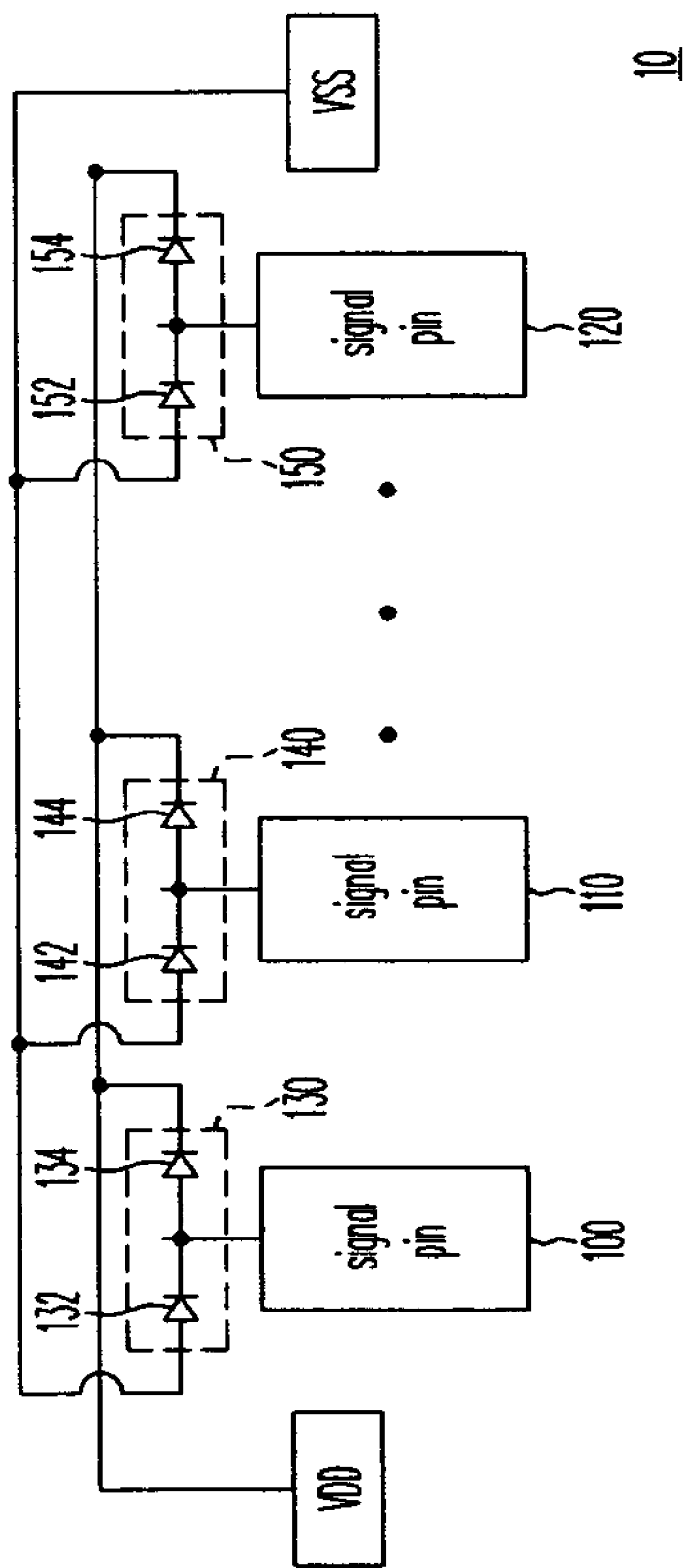
FIG. 1 is a block diagram of an electronic device having ESD protection circuit according to prior art.

Reference will now be made in detail to various embodiments of the invention, examples of which are illustrated in the accompanying drawings. Wherever possible, the same reference numbers are used in the drawings and the description to refer to the same or like parts.

Figure 2:
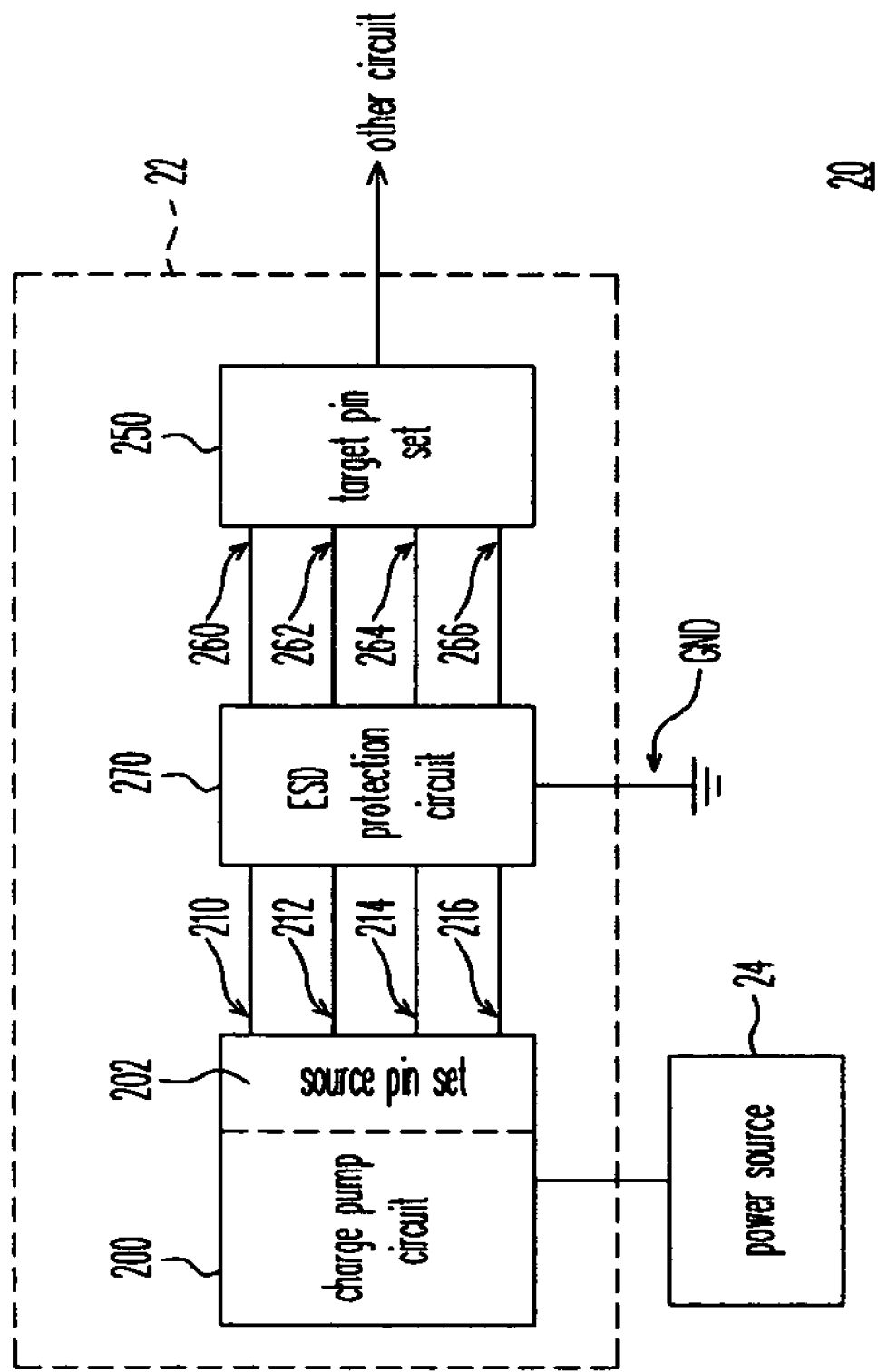
FIG. 2 depicts a block diagram of an electronic system having ESD protection circuit for charge pump circuit according to an embodiment of the present invention.

FIG. 2 is a block diagram of an electronic system 20 having an ESD protection circuit 270 for a charge pump circuit 200 according to an embodiment of the present invention. In the embodiment, electronic system 20 includes an electronic device 22 and a power source 24. Power source 24 provides power to the electronic device 22. The electronic device 22 includes charge pump circuit 200 and ESD protection circuit 270. The charge pump circuit 200 further includes a source pin set 202 and target pin set 250 each comprising positive pins 210-212, 260-262 and negative pins 214-216, 264-266. The power provided by the power source 24 is transmitted to the charge pump circuit 200. Charge pump circuit 200 pumps the voltage of the power to different voltage levels and outputs these pumped voltages via the source pin set 202 and target pin set 250 to other circuits.

Figure 3:
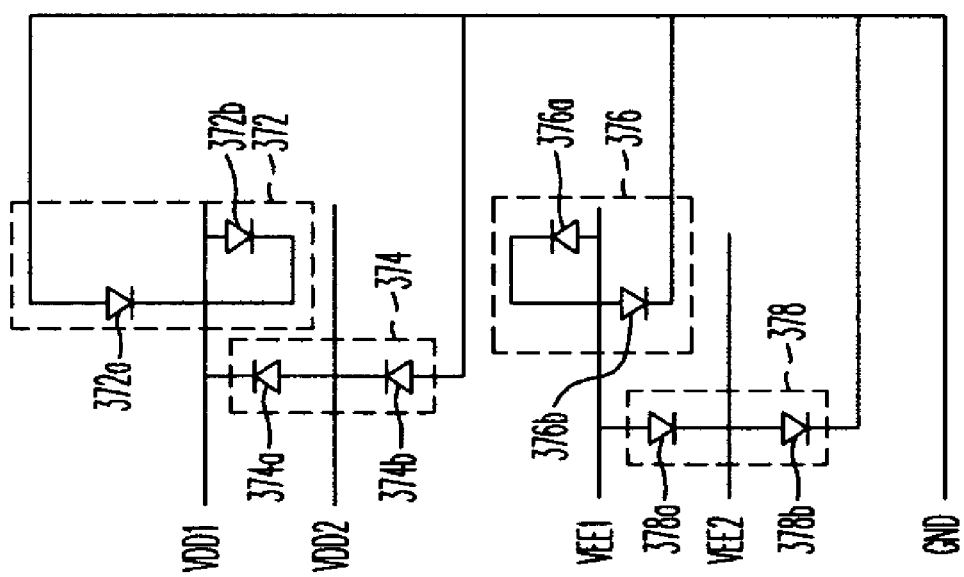
FIG. 3 depicts a circuit diagram of an ESD protection circuit according to an embodiment of the present invention.

According to various embodiments ESD protection circuit 270 can be electrically connected between the source pin set 202 and the target pin set 250. More particularly, the ESD protection circuit 270 is reversely connected in the electronic device 22. FIG. 3 depicts an exemplary circuit diagram of an ESD protection circuit according to an embodiment of the present invention. In this embodiment, VDD1 and VDD2 are positive voltages, and VDD1 can be greater than or equal to VDD2. Further, VEE1 and VEE2 are negative voltages, and VEE1 can be less than or equal to VEE2, i.e., the absolute value of VEE1 is greater than or equal to VEE2. According to various embodiments the ESD protection circuit 370 can include several diode sets 372, 374, 376 and 378, and, for each diode set, two diodes can be included therein. For example, diode set 372 can include two diodes 372a and 372b, diode set 374 can include two diodes 374a and 374b, diode set 376 can include two diodes 376a and 376b, and diode set 378 can include two diodes 378a and 378b.

In the embodiment depicted in FIG. 3, diodes are reversely connected, that is, the diodes are reverse biased. For example, the, anode and cathode of the diode is connected to the same voltage. Also for example, in the diode set 372, diode 372a can be reversely connected since VDD1 is greater than GND (which represents grounding), and anode/cathode of diode 372b are connected to VDD1 so that diode 372b is reversely connected as well. In the diode set 374, diode 374a is reversely connected since VDD1 is greater than VDD2, and diode 374b is reversely connected since VDD2 is greater than GND. In the diode set 376, anode/cathode of diode 376a are connected to VEE1 so that diode 376a is reversely connected, and diode 376b is reversely connected since VEE1 is lower than GND. In the diode set 378, diode 378a is reversely connected since VEE1 is less than or equal to VEE2, and diode 378b is reversely connected since VEE2 is lower than GND.

Figure 4A:
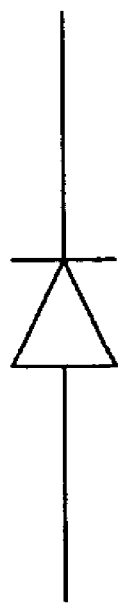
FIG. 4A depicts an example of a diode used in an ESD protection circuit according to an embodiment of the present invention.
Figure 4A:
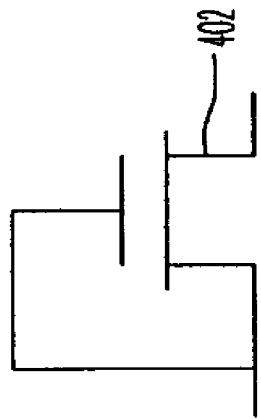
Figure 4B:
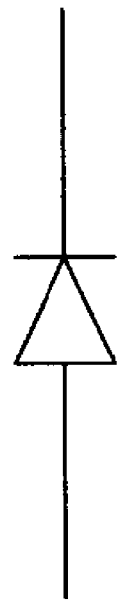
FIG. 4B depicts an example of a diode used in an ESD protection circuit according to an embodiment of the present invention.
Figure 4B:
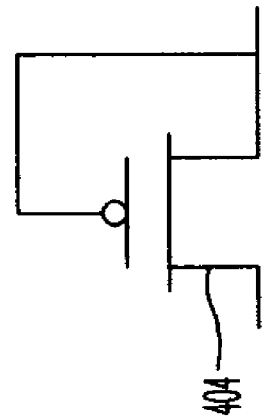

Accordingly, diode sets 372-378 do not work when VDD1, VDD2, VEE1 and VEE2 are in normal situations. However, when electrostatic discharge occurs, one of the diode sets 372-378 works to protect other circuits. According to various embodiments MOS devices, such as NMOS 402 or PMOS 404 shown in FIG. 4A or FIG. 4B, can be employed as the diodes in the diode sets 372-378. Moreover, TFTs may be employed as the diodes as well.

Figure 5:
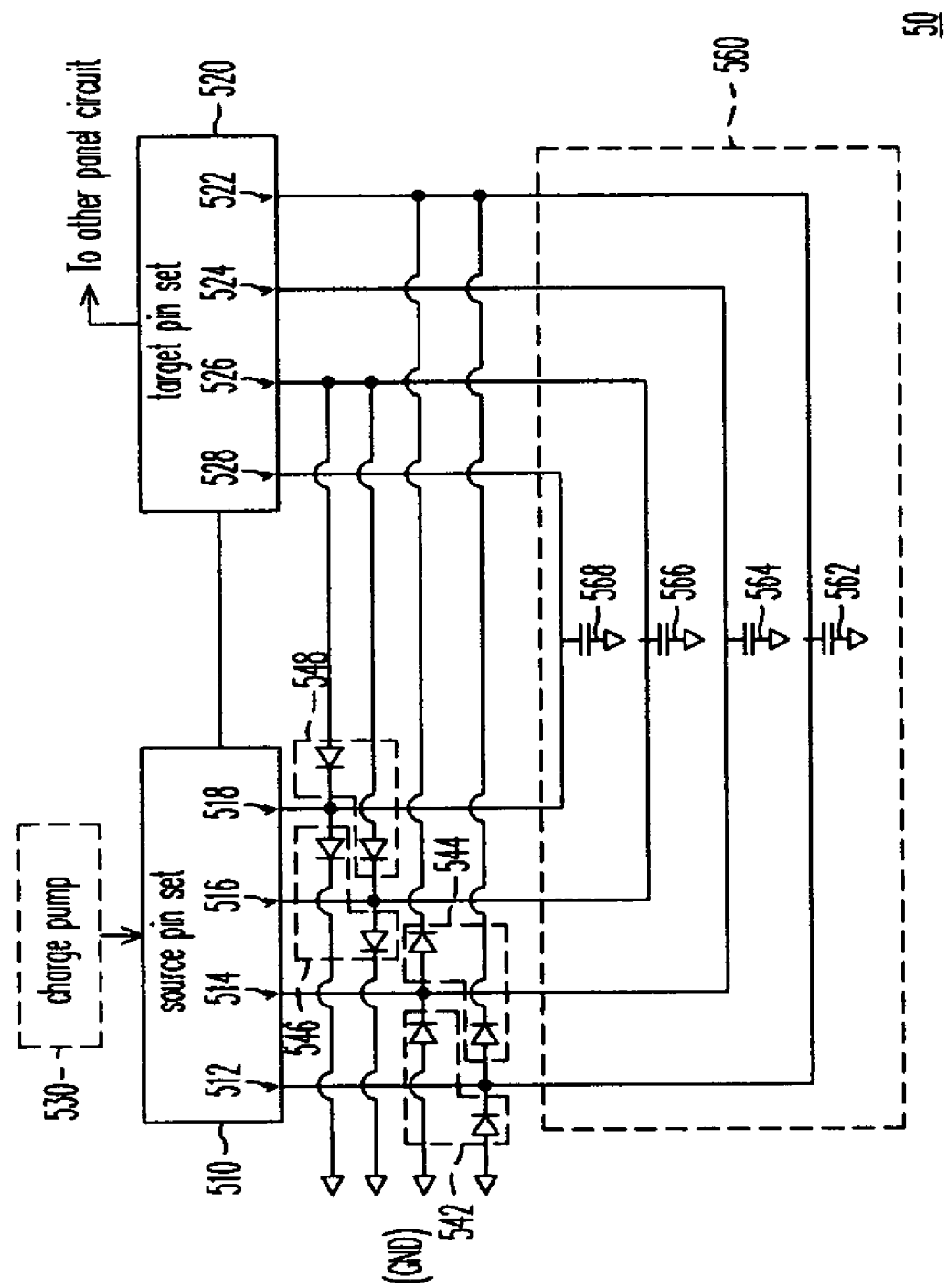
FIG. 5 depicts a block diagram of an electronic device having ESD protection circuit for charge pump circuit according to an embodiment of the present invention.

Referring to FIG. 5, which is a block diagram of an electronic device 50 having ESD protection circuit for charge pump circuit according to an embodiment of the present invention. In the electronic device 50, charge pump 530 generates several voltages and outputs these voltages via a source pin set 510. Target pin set 520 receives the voltages via FPC 560 and transmits these voltages to other circuits, such as a display panel. The FPC 560 provides several lines for electrically connecting pin 512 to pin 522 (in the embodiment shown in FIG. 5 both are named as VDD1), pin 514 to pin 524 (in the embodiment shown in FIG. 5 both are named as VDD2), pin 516 to pin 526 (in the embodiment shown in FIG. 5 both are named as VEE1) and pin 518 to pin 528 (in the embodiment shown in FIG. 5 both are named as VEE2). Further, one terminal of each capacitor 562-568 can be electrically connected to the source pin set 510 and target pin set 520 via the FPC 560. Further, for protecting the charge pump 530 or other panel circuits from being damaged by electrostatic discharging, ESD protection circuit including diode sets 542-548, part of which are reversely connected between source pin set 510 and target pin set 520, and another part of the diode sets 542-548 are reversely connected between the source pin set 510 and GND.

While array testing or light-on testing is proceeding before the FPC 560 being connected to both the source pin set 510 and the target pin set 520, a tester (not shown) provides a highest voltage to pin 522 (VDD1) and a lowest voltage to pin 526 (VEE1) for providing working voltages to the panel circuit. Therefore, under the circumstance that the FPC 560 is not connected, diode set 542 is reversely connected between the pins 512/514 and GND, diode set 544 is reversely connected between the pins 512/514 and pin 522, diode set 546 is reversely connected between the pins 516/518 and GND, and diode set 548 is reversely connected between the pins 516/518 and pin 526. According to various embodiments these diodes do not work because voltages on pin 512 and 514 are less than or equal to the voltage provided on the pin 522, and voltages on pin 516 and 518 are greater than or equal to the voltage provided on the pin 526. Diode sets 542-548 therefore do not affect the normal test operation but can protect the charge pump 510 from being damaged by electrostatic discharging.

Accordingly, an ESD protection circuit provided by the present invention would not affect the normal operation of a charge pump.

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. An ESD protection circuit for a charge pump circuit, the charge pump circuit includes a source pin set, a target pin set and a grounding pin electrically connected to ground, each of the source and target pin set includes a first positive pin providing a first positive voltage, a second positive pin providing a second positive voltage, a first negative pin providing a first negative voltage and a second negative pin providing a second negative voltage, the ESD protection circuit comprising:
   a first diode reversely connected between the first positive pin of the source pin set and the grounding pin;
   a second diode having a first anode and a first cathode, both connected to the first positive pin of the source pin set;
   a third diode reversely connected between the second positive pin of the source pin set and the grounding pin;
   a fourth diode reversely connected between the first positive pin of the source pin set and the second positive pin of the source pin set;
   a fifth diode reversely connected between the first negative pin of the source pin set and the grounding pin;
   a sixth diode having a second anode and a second cathode, both connected to the first negative pin of the source pin set;
   a seventh diode reversely connected between the second negative pin of the source pin set and the grounding pin; and
   an eighth diode reversely connected between the second negative pin of the source pin set and the first negative pin of the source pin set,
   wherein the first positive pin provides voltage greater than or equal to voltage provided by the second positive pin, and the first negative pin provides voltage less than or equal to the voltage provided by the second negative pin.

2. The ESD protection circuit according to claim 1, wherein one of the first, second, third, and fourth diode set includes a MOS device or a thin film transistor.

3. The ESD protection circuit according to claim 1, wherein one terminal of a capacitor is electrically connected to the first positive pins.

4. The ESD protection circuit according to claim 1, wherein one terminal of a capacitor is electrically connected to the first negative pins.

5. The ESD protection circuit according to claim 1, wherein one terminal of a capacitor is electrically connected to the second positive pins.

6. The ESD protection circuit according to claim 1, wherein one terminal of a capacitor is electrically connected to the second negative pins.

7. An ESD protection circuit for a charge pump circuit, wherein the charge pump circuit provides a first voltage pin and a second voltage pin, the absolute value of a voltage provided by the first voltage pin being greater than or equal to the absolute value of a voltage provided by the second voltage pin and the two voltages have the same phase, the ESD protection circuit comprising:
   a first diode reversely connected between the second voltage pin and ground;
   a second diode reversely connected between the first voltage pin and the second voltage pin;
   a third diode reversely connected between the first voltage pin and ground; and
   a fourth diode having an anode and a cathode, both connected to the first voltage pin.

8. The ESD protection circuit according to claim 7 wherein one terminal of a capacitor is electrically connected to the first voltage pin.

9. The ESD protection circuit according to claim 7, wherein one terminal of a capacitor is electrically connected to the second voltage pin.

10. The ESD protection circuit according to claim 7, wherein one of the first and second diode includes a MOS device or a thin film transistor.

11. An electronic device with charge pump circuit having ESD protection circuit, comprising: a charge pump circuit, including a first voltage pin and a second voltage pin, the absolute value of a voltage provided by the first voltage pin being greater than or equal to the absolute value of a voltage provided by the second voltage pin, wherein the two voltages have the same phase; and an ESD protection circuit, comprising:
   a first diode reversely connected between the second voltage pin and ground;
   a second diode reversely connected between the first voltage pin and the second voltage pin;
   a third diode reversely connected between the first voltage pin and ground; and
   a fourth diode having an anode and a cathode, both connected to the first voltage pin.

12. An electronic system with charge pump circuit having ESD protection circuit, comprising: a power source, providing a power; a charge pump circuit, electrically connecting to the power source, wherein the charge pump circuit receives the power, generates voltages, and outputs the voltages having the same phase via a first voltage pin and a second voltage pin respectively, and wherein the absolute value of the voltage output by the first voltage pin being greater than or equal to the absolute value of the voltage output by the second voltage pin; and an ESD protection circuit, comprising:
   a first diode reversely connected between the second voltage pin and ground;
   a second diode reversely connected between the first voltage pin and the second voltage pin;
   a third diode reversely connected between the first voltage pin and ground; and
   a fourth diode having an anode and a cathode, both connected to the first voltage pin.

* * * * *